(12) United States Patent
Li et al.

(10) Patent No.: US 12,148,204 B2
(45) Date of Patent: Nov. 19, 2024

(54) TARGET DETECTION METHOD AND APPARATUS

(71) Applicant: Inspur Suzhou Intelligent Technology Co., Ltd., Suzhou (CN)

(72) Inventors: Feng Li, Suzhou (CN); Xiaojuan Cheng, Suzhou (CN)

(73) Assignee: Inspur Suzhou Intelligent Technology Co., Ltd., Suzhou (CN)

( * ) Notice: Subject to any disclaimer, the term of this patent is extended or adjusted under 35 U.S.C. 154(b) by 54 days.

(21) Appl. No.: 17/778,662

(22) PCT Filed: Jul. 23, 2020

(86) PCT No.: PCT/CN2020/103701
§ 371 (c)(1),
(2) Date: May 20, 2022

(87) PCT Pub. No.: WO2021/098261
PCT Pub. Date: May 27, 2021

(65) Prior Publication Data
US 2023/0045519 A1 Feb. 9, 2023

(30) Foreign Application Priority Data
Nov. 22, 2019 (CN) .......................... 201911157879.X

(51) Int. Cl.
*G06K 9/00* (2022.01)
*G06V 10/25* (2022.01)
(Continued)

(52) U.S. Cl.
CPC .............. *G06V 10/82* (2022.01); *G06V 10/25* (2022.01); *G06V 10/42* (2022.01); *G06V 10/44* (2022.01); *G06V 2201/07* (2022.01)

(58) Field of Classification Search
None
See application file for complete search history.

(56) References Cited

U.S. PATENT DOCUMENTS 11,074,711 B1 * 7/2021 Akbas ................. G06V 10/454
2016/0328838 A1 11/2016 Kwan

FOREIGN PATENT DOCUMENTS

| CN | 106599830 A | 4/2017 |
| CN | 106650662 A | 5/2017 |

(Continued)

OTHER PUBLICATIONS

International Search Report, PCT/CN2020/103701, Oct. 28, 2020.
(Continued)

*Primary Examiner* — SJ Park
(74) *Attorney, Agent, or Firm* — David R. Stevens; Stevens Law Group

(57) ABSTRACT

A target detection method and apparatus. The method comprises: acquiring an input image, and sending same to a candidate region generation network to generate a plurality of regions of interest; formatting the plurality of regions of interest, and then sending same to a target key point network to generate a thermodynamic diagram; using a global feature map of the input image to perform convolution on the thermodynamic diagram, so as to generate a local depth feature map; and fusing the global feature map and the local depth feature map, and detecting a target therefrom by means of a detector. The present invention can be applied to target detection at different scales, improves the detection accuracy and robustness of a target detection technique for an occluded target in complex scenarios, and achieves, by means of making full use of local key point information of the target, target positioning under occlusion.

6 Claims, 4 Drawing Sheets

(51) Int. Cl.
    *G06V 10/42*     (2022.01)
    *G06V 10/44*     (2022.01)
    *G06V 10/82*     (2022.01)

(56) References Cited

FOREIGN PATENT DOCUMENTS

| | | |
|---|---|---|
| CN | 107346409 A | 11/2017 |
| CN | 107766791 A | 3/2018 |
| CN | 108960143 A | 12/2018 |
| CN | 109284670 A | 1/2019 |
| CN | 109508681 A | 3/2019 |
| CN | 109977952 A | 7/2019 |
| CN | 110349148 A | 10/2019 |
| CN | 111126379 A | 5/2020 |
| WO | WO2017190656 A1 | 11/2017 |

OTHER PUBLICATIONS

Written Opinion of the International Searching Authority, PCT/CN2020/103701, Oct. 28, 2020.
Notification to Grant Patent Right, Chinese Application No. 201911157879.X, Apr. 15, 2022.

* cited by examiner

TARGET DETECTION METHOD AND APPARATUS

CROSS-REFERENCE TO RELATED APPLICATIONS

This application claims priority to Chinese Patent Application No. 201911157879.X, filed with the Chinese Patent Office on Nov. 22, 2019 and entitled "TARGET DETECTION METHOD AND APPARATUS." The above-referenced applications are incorporated herein by reference in their entirety.

TECHNICAL FIELD

The present application relates to the field of computer recognition, and in particular, to a target detection method and apparatus.

BACKGROUND

A target detection technique is to detect a target from given image data through image processing and mode recognition algorithms, or the like, and give a target coordinate position and confidence. Target detection is an important research focus in computer vision, and is one of the core technologies in practical applications, such as behavior analysis, attitude estimation, target attribute analysis, intelligent monitoring, autonomous driving and so on. It also has many practical applications, such as autonomous driving, intelligent monitoring and robotics. Therefore, the target detection technique has high scientific research value and commercial value. In recent years, it has attracted great attention in the field of computer vision.

For a given image, in order to obtain positions of all targets in a picture, a detector is required to extract features with a method based on manual features or a method based on depth feature learning. The method based on manual features mainly considers priori information of the target, and makes a series of simple changes to an input image to obtain a target feature. For example, shape information and motion information of the target are mined by using a directional gradient histogram algorithm, or the image is changed differently, and the different changes are fused through an integral channel, so as to form a rich feature set. A detection algorithm of a deformable component model establishes a certain form of spatial constraints for human body parts and detects human body targets according to interaction between a model and the component model. Although the above conventional detection method can reach an application level in simple scenarios, the target detection method based on manual features has low robustness in complex natural scenarios.

In contrast, the method based on depth feature learning can autonomously learn a feature with high robustness through a large amount of data, thereby significantly improving the accuracy of detection. In a prior art, a bounding box is generated by using a bounding box generation network, feature dimensions of regions of interest of different sizes are unified by using a region of interest pooling method, and a depth feature is extracted through a series of full connection layers, which are then used to train a cascade forest, thereby improving the detector's detection performance to a small-scale target. In the prior art, bounding boxes of different scales are further generated by using convolutional layers of different receptive fields. The convolutional layer with a small receptive field is configured to generate a small-scale bounding box, while the convolutional layer with a large receptive field is configured to generate a large-scale bounding box. Then, all the bounding boxes are finely tuned and re-classified to obtain a final detection result. In the prior art, spatial correlation information between the human body parts is also introduced into a depth component detector, thereby improving pedestrian detection performance under occlusion. Most of the most advanced target detection methods have good detection performance under ideal conditions, that is, the target is not occluded or slightly occluded. However, the methods may be seriously affected when the target is seriously occluded. For example, in pedestrian detection, since most body parts are invisible, the detector is easily misled by coverings, thereby failing to effectively recognize pedestrians. Since the target may be occluded by different objects in real-world applications, it is very important to deal with the problem of occlusion for robust target detection.

There is no effective solution at present with respect to the problems in the prior art that a single-scale detector is difficult to deal with targets of different scales, other objects may cause different degrees of occlusion to the target in natural scenarios, and small target features in most monitoring scenarios are not obvious and have low resolution.

SUMMARY

In view of the above, an objective of embodiments of the present application is to propose a target detection method and apparatus, which can be applied to target detection at different scales, improve the detection accuracy and robustness of a target detection technique for an occluded target in complex scenarios, and achieving, by means of making full use of local key point information of the target, target positioning under occlusion.

Based on the above objective, in a first aspect of the embodiments of the present application, a target detection method is provided, including the following steps:
  acquiring an input image, and sending same to a candidate region generation network to generate a plurality of regions of interest;
  formatting the plurality of regions of interest, and then sending same to a target key point network to generate a heat map;
  using a global feature map of the input image to perform convolution on the heat map, so as to generate a local depth feature map; and
  fusing the global feature map and the local depth feature map, and detecting a target therefrom by means of a detector.

In some implementations, formatting the plurality of regions of interest, and then sending same to a target key point network to generate a heat map includes:
  extracting the plurality of regions of interest from the input image, and adjusting same to have a same size;
  pooling the plurality of regions of interest in the target key point network, and sampling same;
  acquiring feature information for the plurality of samples by using a local feature extraction algorithm to generate a plurality of target key point analytical diagrams; and
  formatting the plurality of target key point analytical diagrams to generate the heat map.

In some implementations, using a global feature map of the input image to perform convolution on the heat map, so as to generate a local depth feature map includes:

performing key point depth feature transformation on the heat map to extract, from heat map, a key point depth feature suitable for performing convolution;

performing convolution on the key point depth feature by using a global detection feature of the global feature map to obtain a local key point depth feature; and restoring the local depth feature map according to the local key point depth feature.

In some implementations, the detector includes a deep convolutional neural network with a full connection layer and a classification layer removed and an additional new convolutional layer arranged.

In some implementations, the new convolutional layer includes a first new convolutional layer with high resolution and a small receptive field to detect a small target and a second new convolutional layer with low resolution and a large receptive field to detect a large target.

In a second aspect of the embodiments of the present application, a target detection apparatus is provided, including:

a processor; and a memory storing program code runnable by the processor, the program code, when run, performing the following steps:

acquiring an input image, and sending same to a candidate region generation network to generate a plurality of regions of interest;

formatting the plurality of regions of interest, and then sending same to a target key point network to generate a heat map;

using a global feature map of the input image to perform convolution on the heat map, so as to generate a local depth feature map; and fusing the global feature map and the local depth feature map, and detecting a target therefrom by means of a detector.

In some implementations, formatting the plurality of regions of interest, and then sending same to a target key point network to generate a heat map includes:

extracting the plurality of regions of interest from the input image, and adjusting same to have a same size;

pooling the plurality of regions of interest in the target key point network, and sampling same;

acquiring feature information for the plurality of samples by using a local feature extraction algorithm to generate a plurality of target key point analytical diagrams; and formatting the plurality of target key point analytical diagrams to generate the heat map.

In some implementations, using a global feature map of the input image to perform convolution on the heat map, so as to generate a local depth feature map includes:

performing key point depth feature transformation on the heat map to extract, from the heat map, a key point depth feature suitable for performing convolution;

performing convolution on the key point depth feature by using a global detection feature of the global feature map to obtain a local key point depth feature; and restoring the local depth feature map according to the local key point depth feature.

In some implementations, the detector includes a deep convolutional neural network with a full connection layer and a classification layer removed and an additional new convolutional layer arranged.

In some implementations, the new convolutional layer includes a first new convolutional layer with high resolution and a small receptive field to detect a small target and a second new convolutional layer with low resolution and a large receptive field to detect a large target.

The present application has the following beneficial effects. Through the technical solution of acquiring an input image, and sending same to a candidate region generation network to generate a plurality of regions of interest; formatting the plurality of regions of interest, and then sending same to a target key point network to generate a heat map; using a global feature map of the input image to perform convolution on the heat map, so as to generate a local depth feature map; and fusing the global feature map and the local depth feature map, and detecting a target therefrom by means of a detector, the target detection method and apparatus according to the embodiments of the present application can be applied to target detection at different scales, improving the detection accuracy and robustness of a target detection technique for an occluded target in complex scenarios, and achieving, by means of making full use of local key point information of the target, target positioning under occlusion.

BRIEF DESCRIPTION OF DRAWINGS

In order to more clearly illustrate the technical solutions in embodiments of the present application or the prior art, the accompanying drawings used in the description of the embodiments or the prior art will be briefly introduced below. It is apparent that, the accompanying drawings in the following description are only some embodiments of the present application, and other drawings can be obtained by those of ordinary skill in the art from the provided drawings without creative efforts.

DESCRIPTION OF EMBODIMENTS

In order to make the objectives, technical solutions and advantages of the present application clearer, the embodiments of the present application are described in further detail below in conjunction with specific embodiments and with reference to the drawings.

It is to be noted that all the expressions of "first" and "second" in the embodiments of the present application are intended to distinguish two different entities or parameters with the same name, so "first" and "second" are for convenience of description only and should not be construed as limitations on the embodiments of the present application, which are no longer described one by one in the following embodiments.

Figure 1:
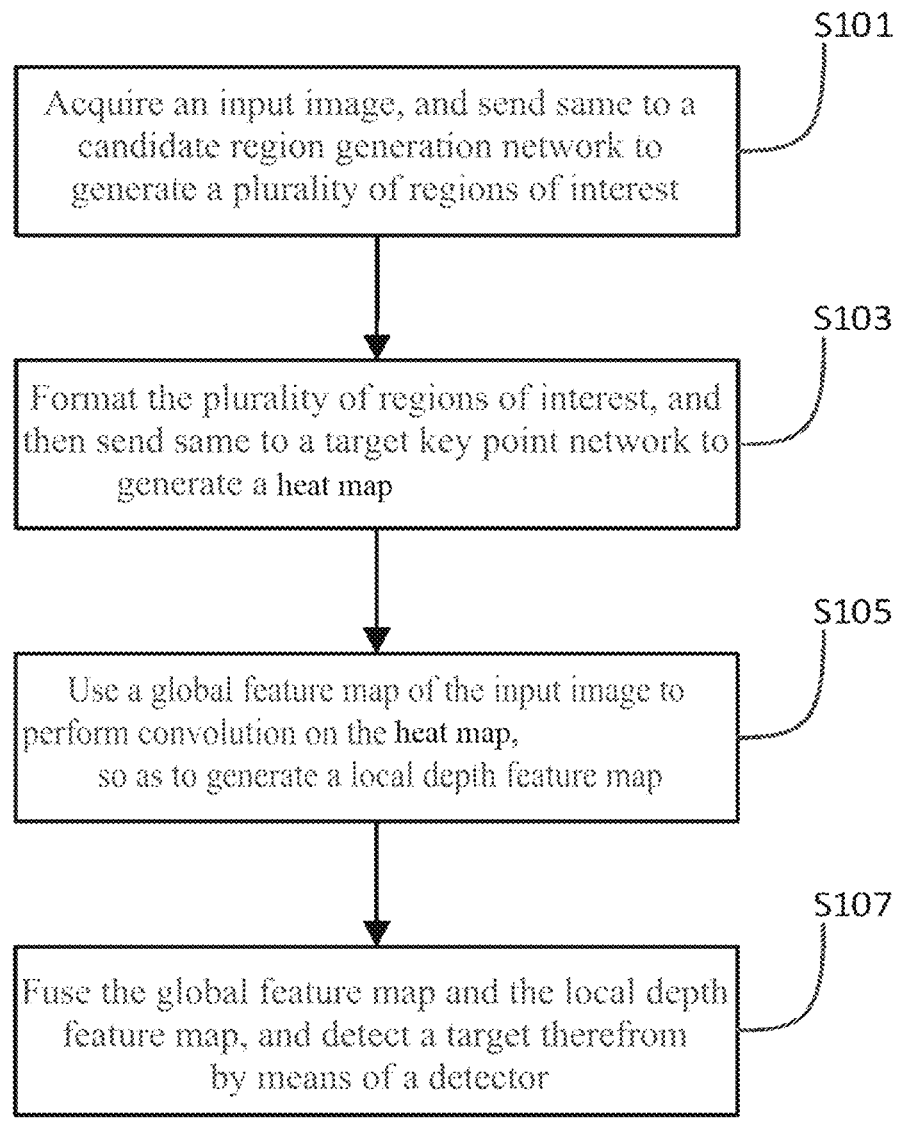
FIG. 1 is a schematic flowchart of a target detection method according to the present application.

Based on the above objective, in a first aspect of the embodiments of the present application, an embodiment of a target detection method applicable to different scales is proposed. FIG. 1 is a schematic flowchart of a target detection method according to the present application.

The target detection method includes the following steps as shown in FIG. 1.

In step S101, an input image is acquired and sent to a candidate region generation network to generate a plurality of regions of interest.

In step S103, the plurality of regions of interest are formatted and then sent to a target key point network to generate a heat map.

In step S105, a global feature map of the input image is used to perform convolution on the heat map, so as to generate a local depth feature map.

In step S107, the global feature map and the local depth feature map are fused, and a target therefrom is detected by means of a detector.

The present application discloses a method based on fusion of local key features of a target to improve the detection accuracy and robustness of an existing target detection technique for an occluded target in complex scenarios. It is proposed in the present application that feature layers with different receptive fields are combined to obtain more local information and background information, so that the detector is more robust for target detection at different scales, and, by means of making full use of local key point information of the target, target positioning under occlusion is achieved. The target detection solution includes a global region generation network configured to extract a global feature of the target, a target key point detection network configured to extract a local feature, and feature fusion for fusing features of two scales.

It is proposed in the present application that the region of interests are generated by using the candidate region generation network, and then are classified (targets/backgrounds) by using an occlusion perception deep network. In order to effectively recognize the occluded target, it is proposed in the present application that occluded samples are randomly generated and a specific position of a covering is provided, so that the occlusion perception deep network can effectively distinguish the target and the covering.

Those of ordinary skill in the art may understand that all or some of the processes of the methods in the embodiments may be implemented by a computer program instructing relevant hardware. The program may be stored in a computer-readable storage medium. When the program is executed, the processes of the methods in the embodiments are performed. The storage medium may be a magnetic disk, an optical disc, a read-only memory (ROM), or a random access memory (RAM), or the like. The embodiment of the computer program may achieve the same or similar effects as any foregoing method embodiment corresponding thereto.

In some implementations, formatting the plurality of regions of interest, and then sending same to a target key point network to generate a heat map includes:
  extracting the plurality of regions of interest from the input image, and adjusting same to have a same size;
  pooling the plurality of regions of interest in the target key point network, and sampling same;
  acquiring feature information for the plurality of samples by using a local feature extraction algorithm to generate a plurality of target key point analytical diagrams; and
  formatting the plurality of target key point analytical diagrams to generate the heat map.

In some implementations, using a global feature map of the input image to perform convolution on the heat map, so as to generate a local depth feature map includes:
  performing key point depth feature transformation on the heat map to extract, from the heat map, a key point depth feature suitable for performing convolution;
  performing convolution on the key point depth feature by using a global detection feature of the global feature map to obtain a local key point depth feature; and
  restoring the local depth feature map according to the local key point depth feature.

In some implementations, the detector includes a deep convolutional neural network with a full connection layer and a classification layer removed and an additional new convolutional layer arranged.

In some implementations, the new convolutional layer includes a first new convolutional layer with high resolution and a small receptive field to detect a small target and a second new convolutional layer with low resolution and a large receptive field to detect a large target.

The method according to the embodiment of the present application may be further implemented as a computer program executed by a CPU. The computer program may be stored in a computer-readable storage medium. When the computer program is executed by the CPU, the above functions defined in the method according to the embodiment of the present application are implemented. The above method steps and system units may also be implemented by using a controller and the computer-readable storage medium configured to store a computer program causing the controller to implement the above steps or functions of the units.

Figure 2:
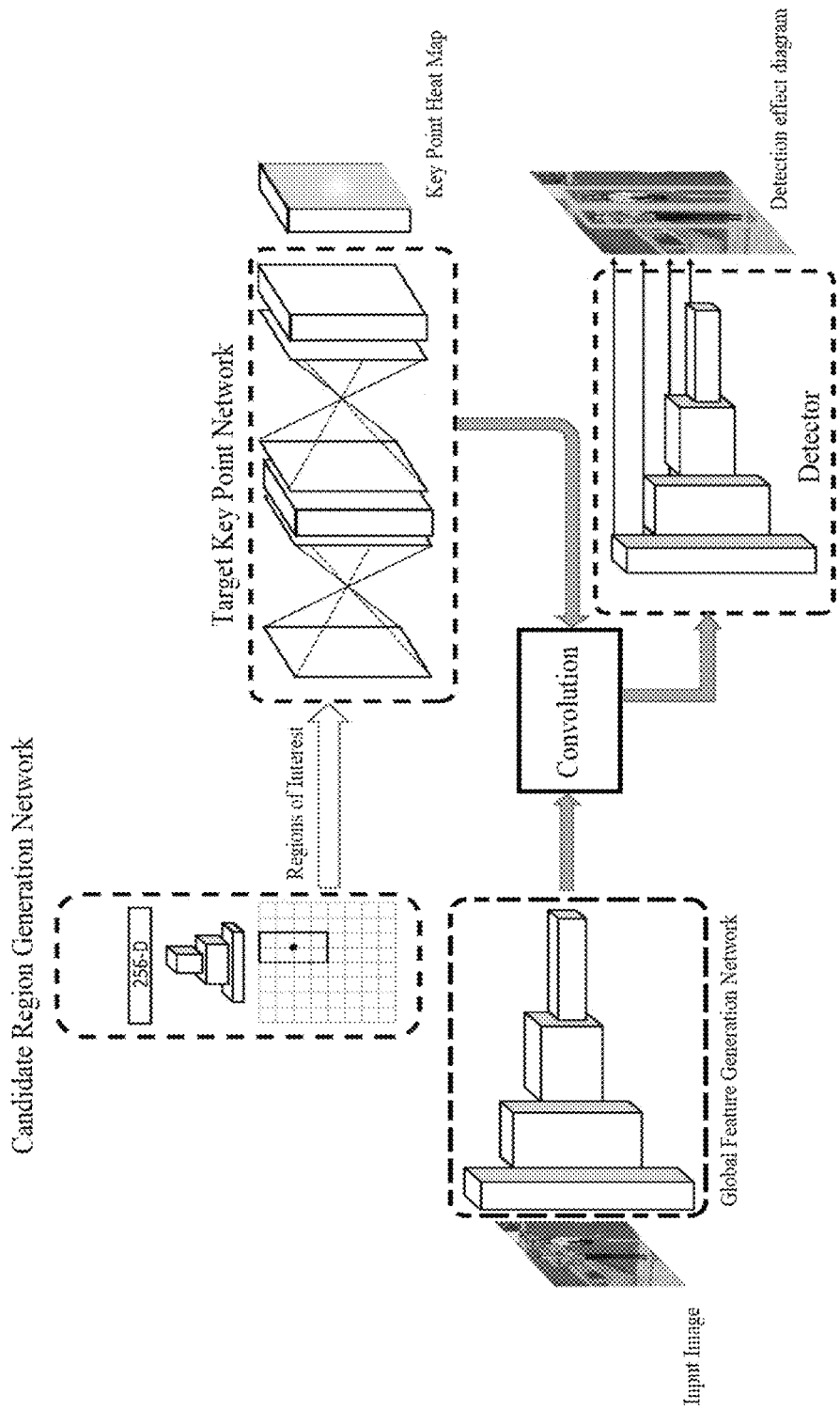
FIG. 2 is a schematic diagram of an overall architecture of the target detection method according to the present application.

Specific implementations of the present application are further described below according to the specific embodiment shown in FIG. 2. Referring to FIG. 2, the process of the embodiment of the present application is as follows.
  1) An input image is sent to a candidate region generation network.
  2) The candidate region generation network generates a series of regions of interest, including targets and backgrounds.
  3) The regions of interest are clipped from an original image and adjusted to images of a same size, and candidate regions are sent to a target key point network to generate a heat map.
  4) Convolution is performed on the target key point heat map and a high-resolution feature map (also referred to as a "global feature map." generated by a global feature generation network depicted in FIG. 2), so as to highlight features of various parts of a target. This may achieve target positioning under occlusion.
  5) A detection feature combines adjacent feature maps with different receptive field sizes to obtain richer local and background information of the target, which further enhances the detector's robustness to targets of different scales.

A main architecture of a pedestrian detector is based on a deep convolutional neural network. The deep convolutional neural network VGG16 suitable for classification is adjusted to be capable of performing a detection task. Specifically, all full connection layers and classification layers are removed, and a series of convolutional layers are added behind the convolutional neural network. The new convolutional layers have broader receptive fields, so as to detect large-scale pedestrians more effectively. The VGG16 neural network is composed of a series of convolutional layers and pooling layers, so that receptive fields of the feature layers thereof have gradually decreasing resolution as a network depth gradually increases. In the present application, pedestrians of different scales are detected by using feature layers with different receptive fields and resolution. A shallow feature map with high resolution and a small receptive field is used to detect a small target, while a deep feature map with low resolution and a large receptive field is used to detect a large target. Different from a conventional deep convolutional network, for human body key point analysis, an hourglass architecture is used to generate a heat map of key points, such as the head, left and right elbows and left and right knees.

The target key point detection network referred to in the present application is intended to highlight a local feature of the target and implement robustness of detection on an occluded target. In consideration of a real-time requirement of target detection, in the present application, a bounding box generation network is removed, bounding boxes B of different sizes are manually set at each position of a detection layer, and the bounding boxes detected by the detector are finely tuned and classified to obtain a final detection result, which can effectively improve the efficiency of detection. The key point network is established based on the bounding boxes. The bounding boxes detected by the detector are sent to a detection network as a global feature $F_g$ of the target on the one hand, and sent to a key point network H to generate a heat map M of key points on the other hand.

$$M=H(B)$$

Figure 3:
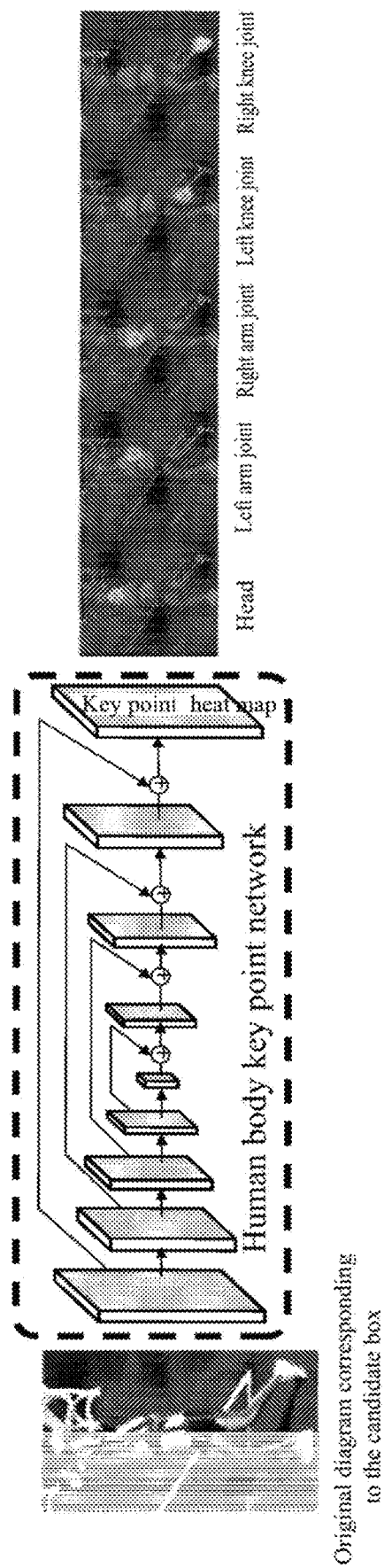
FIG. 3 is a specific architecture diagram of a target key point network of the target detection method according to the present application.
Figure 4:
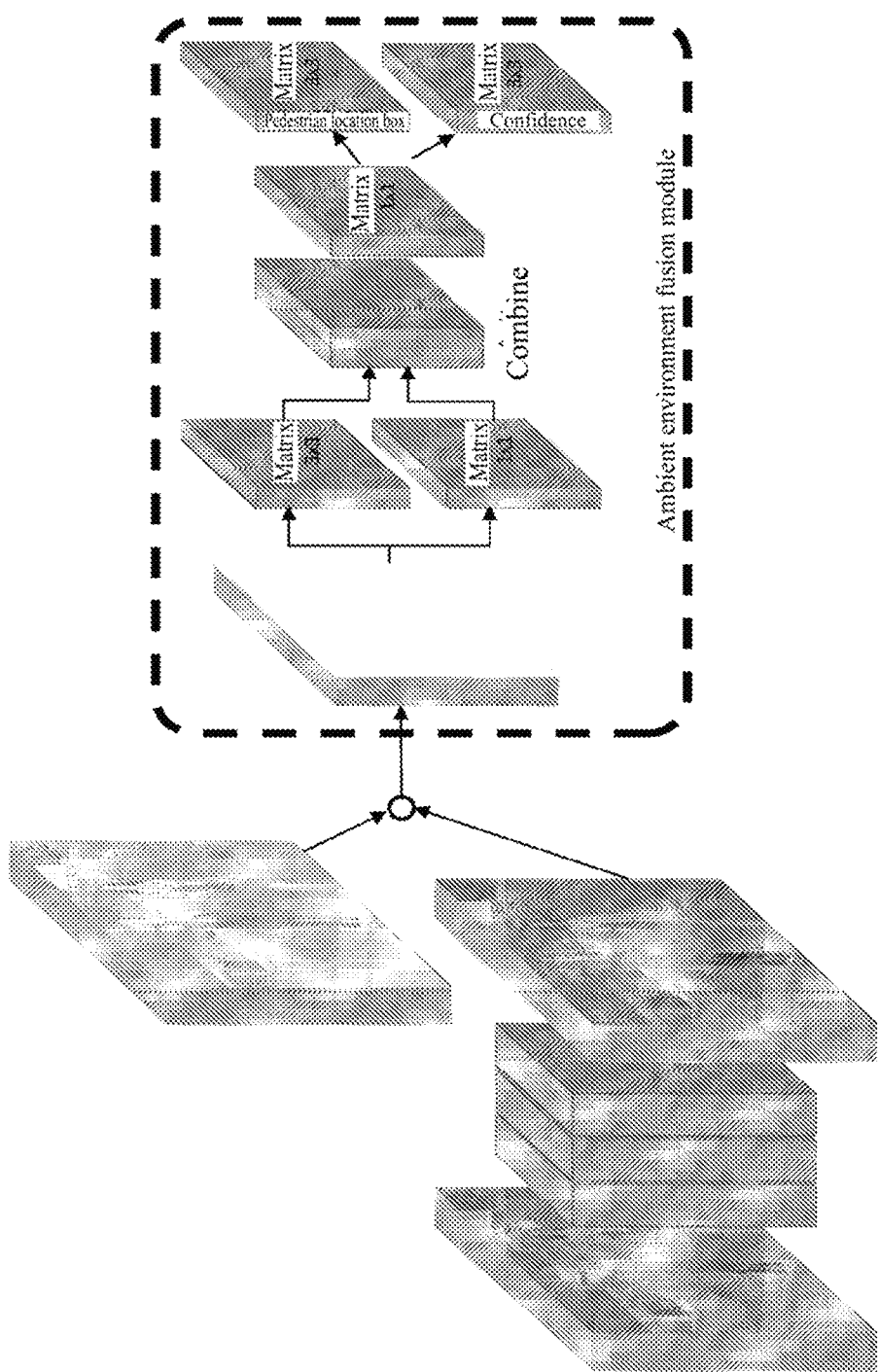
FIG. 4 is a specific architecture diagram of a detector of the target detection method according to the present application.

After a series of pooled down-sampling for the key point network H, the convolutional layer is up-sampled back to an original size. During the up-sampling, a local feature extraction algorithm is used to mine multi-level feature information to obtain a target key point analytical diagram. In order to obtain a key point depth feature and assist the detection network, a target analytical diagram is up-sampled to a size of detection feature and to have the same number of channels as the detection feature, as shown in FIG. 3.

The obtained global and local key features are fused in the present application. Due to a series of pooling and compression, in the feature of the detection layer, information about the small target is easy to be lost, and other objects may be misjudged as small-scale targets or parts of occluded targets, resulting in missed detection and false detection. In order to enhance the robustness of the feature of the detection layer to small targets and local parts, the local key point feature is used to assist the feature of the detection layer of the global feature of the target to express information of a detected target:

$$F_l=D_k(M)\odot F_g$$

$$F=\text{concat}(F_l, F_g)$$

where $F_l$ denotes a local key point depth feature, M in $D_k(M)$ denotes a pedestrian part analytical diagram, $D_k$ denotes a key point depth feature transformation operation, which is sampled s times and has a number of channels of c to satisfy a convolution operation, $F_g$ denotes a feature of a global target detection layer, and $\odot$ denotes the convolution operation. By dot multiplying the detection feature by the key point depth feature, most of the backgrounds are filtered out and regions of the human body parts are highlighted. The expression capability of the detection feature can be effectively improved by local fusion of a key point feature and a global pedestrian feature.

As can be seen from the above embodiment, through the technical solution of acquiring an input image, and sending same to a candidate region generation network to generate a plurality of regions of interest: formatting the plurality of regions of interest, and then sending same to a target key point network to generate a heat map; using a global feature map of the input image to perform convolution on the heat map, so as to generate a local depth feature map; and fusing the global feature map and the local depth feature map, and detecting a target therefrom by means of a detector, the target detection method according to the embodiment of the present application can be applied to target detection at different scales, improving the detection accuracy and robustness of a target detection technique for the occluded target in complex scenarios, and achieving, by means of making full use of local key point information of the target, target positioning under occlusion.

It is to be particularly noted that the steps in each embodiment of the target detection method can be interchanged, replaced, added and deleted. Therefore, these rational arrangement, combination and alteration to the target detection method should also fall into the protection scope of the present application, and the protection scope of the present application is not limited to the embodiments.

Based on the above objective, in a second aspect of the embodiments of the present application, an embodiment of a target detection apparatus is proposed. A target detection apparatus includes:
 a processor; and
 a memory storing program code runnable by the processor, the program code, when run, performing the following steps:
 acquiring an input image, and sending same to a candidate region generation network to generate a plurality of regions of interest;
 formatting the plurality of regions of interest, and then sending same to a target key point network to generate a heat map;
 using a global feature map of the input image to perform convolution on the heat map, so as to generate a local depth feature map; and
 fusing the global feature map and the local depth feature map, and detecting a target therefrom by means of a detector.

In some implementations, formatting the plurality of regions of interest, and then sending same to a target key point network to generate a heat map includes:
 extracting the plurality of regions of interest from the input image, and adjusting same to have a same size;
 pooling the plurality of regions of interest in the target key point network, and sampling same;
 acquiring feature information for the plurality of samples by using a local feature extraction algorithm to generate a plurality of target key point analytical diagrams; and
 formatting the plurality of target key point analytical diagrams to generate the heat map.

In some implementations, using a global feature map of the input image to perform convolution on the heat map, so as to generate a local depth feature map includes:
 performing key point depth feature transformation on the heat map to extract, from the heat map, a key point depth feature suitable for performing convolution;
 performing convolution on the key point depth feature by using a global detection feature of the global feature map to obtain a local key point depth feature; and
 restoring the local depth feature map according to the local key point depth feature.

In some implementations, the detector includes a deep convolutional neural network with a full connection layer and a classification layer removed and an additional new convolutional layer arranged.

In some implementations, the new convolutional layer includes a first new convolutional layer with high resolution and a small receptive field to detect a small target and a second new convolutional layer with low resolution and a large receptive field to detect a large target.

As can be seen from the above embodiment, through the technical solution of acquiring an input image, and sending same to a candidate region generation network to generate a plurality of regions of interest; formatting the plurality of regions of interest, and then sending same to a target key point network to generate a heat map; using a global feature map of the input image to perform convolution on the heat map, so as to generate a local depth feature map; and fusing the global feature map and the local depth feature map, and detecting a target therefrom by means of a detector, the target detection apparatus according to the embodiment of the present application can be applied to target detection at different scales, improving the detection accuracy and robustness of a target detection technique for an occluded target in complex scenarios, and achieving, by means of making full use of local key point information of the target, target positioning under occlusion.

It is to be particularly noted that the embodiment of the target detection apparatus uses the embodiment of the target detection method to specify the working process of each module, and those skilled in the art can easily envisage applying the modules to other embodiments of the target detection method. Certainly, since the steps in the embodiment of the target detection method can be interchanged, replaced, added and deleted, these rational arrangement, combination and alternation to the target detection apparatus should also fall into the protection scope of the present application, and the protection scope of the present application is not limited to the embodiments.

The above are exemplary embodiments disclosed in the present application. However, it is to be noted that various changes and modifications may be made without departing from the scopes disclosed in the embodiments of the present application defined in the appended claims. The functions, steps and/or actions of the method claims of the embodiments disclosed herein do not have to be executed in any particular order. Furthermore, although elements disclosed in the embodiments of the present application may be described or claimed as an individual form, the elements may be understood as a plural form unless explicitly defined as a singular form.

It is to be understood that as used herein, unless the context clearly supports exceptions, the singular forms "a/an" is intended to include the plural forms. It is also to be understood that "and/or" used herein is intended to include any and all possible combinations of one or more of the associated listed items. The serial number of the embodiments disclosed in the embodiments of the present application is merely used for illustration without representing the merits of the embodiments.

Those of ordinary skill in the art may appreciate that all or part of the steps to achieve the above embodiments may be accomplished by hardware or by instructing relevant hardware via a program. The program may be stored in a computer-readable storage medium, such as a read-only memory, a magnetic disk or an optical disc.

Those of ordinary skill in the art may appreciate that any of the embodiments discussed is exemplary only and is not intended to imply that the scopes disclosed in the embodiments of the present application (including claims) are limited to these examples; the embodiments or the technical features in the different embodiments may be combined in accordance with the idea of the embodiments of the present application, and there are many other variations of the different aspects of the embodiments of the present application as described above without descriptions in the details for simplicity. Therefore, any omissions, modifications, equivalent replacements and improvements made within the spirit and principles of the embodiments of the present application should fall within the protection scope of the embodiments of the present application.

What is claimed is:

1. A target detection method, comprising the following steps:
    acquiring an input image, and sending same to a candidate region generation network to generate a plurality of regions of interest;
    adjusting the plurality of regions of interest to a same size, and then sending same to a target key point network to generate a heat map;
    using a global feature map of the input image to perform convolution on the heat map, so as to generate a local depth feature map wherein the global feature map is generated by a global feature generation network; and
    fusing the global feature map and the local depth feature map, and detecting a target therefrom by means of a detector.

2. The method according to claim 1, wherein the detector comprises a deep convolutional neural network with a full connection layer and a classification layer removed and an additional new convolutional layer arranged.

3. The method according to claim 2, wherein the new convolutional layer comprises a first new convolutional layer and a second new convolutional layer with different receptive fields and resolutions to detect targets of different scales.

4. A target detection apparatus, comprising:
    a processor; and
    a memory storing program code runnable by the processor, the program code, when run, performing the following steps:
    acquiring an input image, and sending same to a candidate region generation network to generate a plurality of regions of interest;
    adjusting the plurality of regions of interest to a same size, and then sending same to a target key point network to generate a heat map;
    using a global feature map of the input image to perform convolution on the heat map, so as to generate a local depth feature map wherein the global feature map is generated by a global feature generation network; and
    fusing the global feature map and the local depth feature map, and detecting a target therefrom by means of a detector.

5. The apparatus according to claim 4, wherein the detector comprises a deep convolutional neural network with a full connection layer and a classification layer removed and an additional new convolutional layer arranged.

6. The apparatus according to claim 5, wherein the new convolutional layer comprises a first new convolutional layer with high resolution and a small receptive field to detect a small target and a second new convolutional layer with low resolution and a large receptive field to detect a large target.

* * * * *